United States Patent
Lin et al.

(10) Patent No.: US 10,427,351 B2
(45) Date of Patent: Oct. 1, 2019

(54) APPARATUS FOR INDUCTION HEATING AND BENDING OF THERMOPLASTIC COMPOSITE TUBES AND A METHOD FOR USING SAME

(71) Applicant: General Electric Company, Schenectady, NY (US)

(72) Inventors: Wendy Win-Ling Lin, Montgomery, OH (US); Gary Scott Reese, Wilmington, OH (US); Tsarafidy Raminosoa, Niskayuna, NY (US); Nathaniel Benedict Hawes, Milton, NY (US)

(73) Assignee: General Electric Company, Schenectady, NY (US)

( * ) Notice: Subject to any disclaimer, the term of this patent is extended or adjusted under 35 U.S.C. 154(b) by 403 days.

(21) Appl. No.: 15/047,993

(22) Filed: Feb. 19, 2016

(65) Prior Publication Data
US 2017/0239877 A1    Aug. 24, 2017

(51) Int. Cl.
*B29C 53/08* (2006.01)
*B29C 53/84* (2006.01)
(Continued)

(52) U.S. Cl.
CPC .......... *B29C 53/083* (2013.01); *B29C 53/84* (2013.01); *H05B 6/105* (2013.01); *H05B 6/40* (2013.01); *B21D 9/04* (2013.01); *B29C 33/06* (2013.01); *B29C 35/0805* (2013.01); *B29C 53/08* (2013.01); *B29L 2023/004* (2013.01); *B29L 2031/3076* (2013.01); *H05B 6/06* (2013.01); *H05B 6/36* (2013.01)

(58) Field of Classification Search
CPC ....... B29C 53/08; B29C 53/083; B29C 53/84; B29C 33/06; B29C 35/0805; B21D 9/04; H05B 6/105; H05B 6/36; H05B 6/40; H05B 6/06
USPC .................. 425/174.8 R; 264/472, 486, 487
See application file for complete search history.

(56) References Cited

U.S. PATENT DOCUMENTS

| | | | |
|---|---|---|---|
| 4,109,361 | A | 8/1978 | Hagen et al. |
| 4,160,006 | A | 7/1979 | Patzner et al. |

(Continued)

FOREIGN PATENT DOCUMENTS

| | | |
|---|---|---|
| JP | S55-141494 U | 10/1980 |
| JP | S63-249631 A | 10/1988 |

(Continued)

OTHER PUBLICATIONS

Extended European Search Report and Opinion issued in connection with corresponding EP Application No. 17155840.6 dated Jun. 21, 2017.

(Continued)

*Primary Examiner* — Joseph S Del Sole
*Assistant Examiner* — Lawrence D. Hohenbrink, Jr.
(74) *Attorney, Agent, or Firm* — General Electric; Kristi Davidson

(57) ABSTRACT

An apparatus for bending a composite tube that includes an induction coil. Induction coil includes multiple turns and the turn-to-turn spacing changes at least once along the length of the induction coil. There is a heating element positioned near the induction coil and the induction coil is configured to cause the heating element to increase in temperature.

10 Claims, 5 Drawing Sheets

(51) Int. Cl.
  *H05B 6/10* (2006.01)
  *H05B 6/40* (2006.01)
  *B21D 9/04* (2006.01)
  *B29C 33/06* (2006.01)
  *B29C 35/08* (2006.01)
  *H05B 6/36* (2006.01)
  *H05B 6/06* (2006.01)
  *B29L 23/00* (2006.01)
  *B29L 31/30* (2006.01)

(56) References Cited

U.S. PATENT DOCUMENTS

| | | | |
|---|---|---|---|
| 4,177,661 A | 12/1979 | Schwarzbach et al. | |
| 4,596,128 A | 6/1986 | Ringersma et al. | |
| 5,032,700 A * | 7/1991 | Sugiyama | B29C 33/02 219/388 |
| 5,176,866 A * | 1/1993 | Tanaka | B29C 33/505 249/184 |
| 5,240,542 A | 8/1993 | Miller et al. | |
| 5,422,048 A * | 6/1995 | Kodama | B29C 35/0261 264/173.17 |
| 5,504,308 A | 4/1996 | Shiozaki | |
| 6,346,211 B1 | 2/2002 | Rafferty et al. | |
| 7,553,148 B2 * | 6/2009 | Takamatsu | B21D 9/073 264/339 |
| 8,066,841 B2 | 11/2011 | Ganz | |
| 8,556,619 B2 | 10/2013 | Matsen et al. | |
| 8,657,595 B2 | 2/2014 | Feigenblum et al. | |
| 8,796,600 B2 | 8/2014 | Handa | |
| 2005/0087910 A1 | 4/2005 | Fawley | |
| 2014/0007639 A1 | 1/2014 | Schaefer | |
| 2016/0001039 A1 * | 1/2016 | Armour | A61M 25/0009 72/342.92 |

FOREIGN PATENT DOCUMENTS

| | | |
|---|---|---|
| JP | S64-69329 A | 3/1989 |
| JP | H04169642 A | 6/1992 |
| JP | H06190913 A | 7/1994 |
| JP | 2001-100571 A | 4/2001 |
| JP | 2001-319765 A | 11/2001 |

OTHER PUBLICATIONS

Machine Translation and Notification of Reasons for Refusal issued in connection with corresponding JP Application No. 2017-021835 dated May 29, 2018.

First office action and Search issued in connection with corresponding CN Application No. 201710085954.0 dated Sep. 27, 2018 (with machine translation).

Notification of Reasons for Refusal issued in connection with corresponding JP Application No. 2017-021835 dated Oct. 9, 2018 (with machine translation).

* cited by examiner ial composite tubes and a method for using same

BACKGROUND OF THE INVENTION

The present invention relates to bending of thermoplastic tubes and more specifically to an apparatus and method for induction heating and bending of thermoplastic composite tubes.

Aircraft components and aircraft engines require lightweight parts in order to be efficient. Tubing for fuel flow and for gas flow are conventionally formed of metallic materials. Substituting lighter-weight thermoplastic materials for tubing formed of metallic materials can result in lighter-weight and more efficient engines and aircraft components. However, conventional thermoplastic materials do not have suitable strength characteristics for such applications. Fiber reinforced composite tubes can be used for some specialized applications that require more strength than available in standard thermoplastics. However conventional methods of making fiber reinforced tubes with bends and turns suitable for aircraft components and aircraft engines are complex and expensive.

BRIEF DESCRIPTION OF THE INVENTION

This need is addressed by an apparatus and method for forming thermoplastic composite tubes that are reinforced with fiber into shapes that have one or more bends. The method uses induction heating to soften a predetermined length of tubing in a controlled manner prior to bending the tubing.

An apparatus for bending a composite tube that includes an induction coil. The induction coil includes multiple turns and the turn-to-turn spacing changes at least once along the length of the induction coil. There is a heating element positioned near the induction coil and the induction coil is configured to cause the heating element to increase in temperature.

A method for bending a composite tube using an induction coil and a heating element to heat a composite tube for bending. The method includes the steps of: positioning the composite tube such that at least a portion of the composite tube is positioned near the heating element; applying current to the induction coil; heating the heating element; heating a work region W of the composite tube; positioning work region W such that it is between a die and a clamp; closing bending device such that work region W is captured between the die and the clamp and the composite tube is bent around the die forming a bend.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
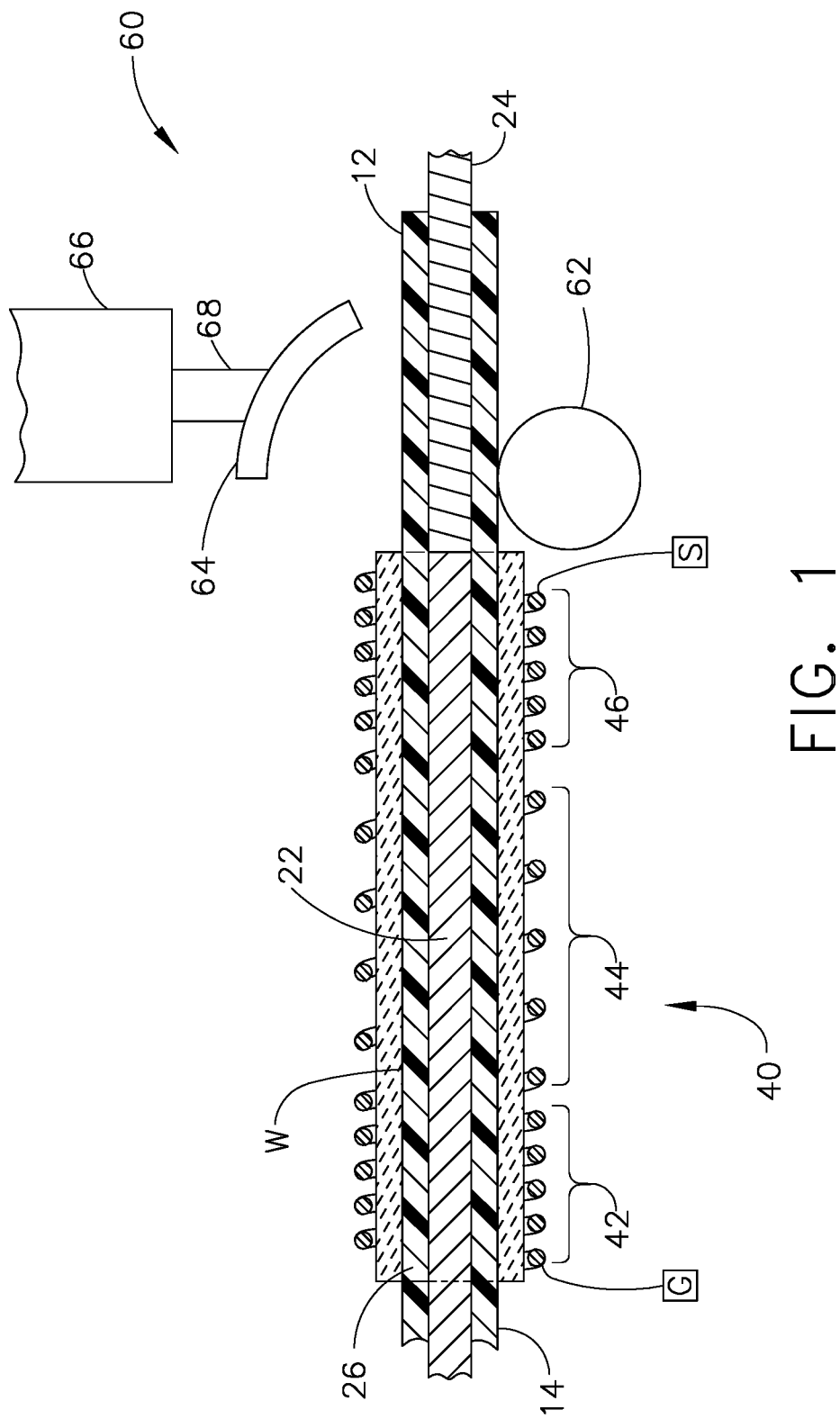
FIG. 1 is a partially cutaway side view of an apparatus for induction heating and bending of a thermoplastic tube.

Referring to the drawings wherein identical reference numerals denote the same elements throughout the various views, FIG. 1 shows a composite tube 12 positioned within a bending the apparatus 10 prior to the tube 12 being heated by induction heating and a bend 80 being made being made in the composite tube 12. As used herein, the term "induction heating" refers to the process of heating an electrically conductive material by electromagnetic induction through heat generated in the material by eddy currents.

The composite tube 12 is generally cylindrical and includes fibers positioned within a polymeric matrix. According to the illustrated embodiment, the fibers are carbon fibers and are configured to reinforce the polymeric matrix. By way of example and not limitation, the materials for the fibers can be chosen from one of the following: carbon, glass, polymer, basalt, quartz, metal, and a combination thereof. The fibers are oriented circumferentially around the composite tube 12. By way of example and not limitation, the fibers can be oriented in one of the following forms: braided, woven, in tape form, positioned at 54°, and a combination thereof. The polymeric matrix is preferably poly ether ether ketone (PEEK). By way of example and not limitation, other suitable thermoplastics for use as the matrix include: polyphenylsulfone (PPSU), poly phenylene sulfide (PPS), polyetherimde (PEI), nylon, polyester, polypropylene, and a combination thereof. The dimensions of the composite tube 12 can be as follows: preferably the maximum diameter is about 1.5 inches; and more preferably the maximum diameter is about three quarters of an inch; and even more preferably one half of an inch; and even more preferably one quarter of an inch. It should be appreciated that the maximum diameter can be larger than 1.5 inches.

The apparatus 10 includes a rigid mandrel 22 that is configured to support the composite tube 12 while the composite tube 12 is being heated. As shown in FIG. 1, at least a portion of the composite tube 12 is positioned around the rigid mandrel 22. The rigid mandrel 22 is configured to support the composite tube 12. In the illustrated embodiment, the rigid mandrel 22 is formed of a metallic material. The rigid mandrel 22 can be formed of a conductive material or include a conductive material such that the rigid mandrel 22 can be heated by induction heating. In other embodiments, the rigid mandrel 22 can be formed of a nonconductive material such as a ceramic as will be discussed further below.

At least a portion of the rigid mandrel 22 and at least a portion of the composite tube 12 surrounding the rigid mandrel 22 are positioned within an induction coil 40. The portion of the composite tube 12 that is positioned within the induction coil 40 defines a working region W at the beginning of a bending process as will be described further below. Stated another way, the working region W is the region of the composite tube 12 that will be heated by the induction coil 40 and subsequently bent.

As shown in FIG. 1, a sleeve 26 is positioned around the working region W of the composite tube 12. The sleeve 26 is operable to provide external support to the composite tube 12 such that the shape and configuration of the composite tube 12 is generally maintained while it is positioned within the induction coil 40. According to the illustrated embodiment, the sleeve 26 is nonconductive and therefore is not configured to provide heat during operation of the induction coil 40. By way of example and not limitation, the sleeve 26 is formed of one of the following: a ceramic, alumina, silica, alumina-silicate, nitrides, carbides, porcelain, refractory, glass, borosilicate, and a combination thereof.

The rigid mandrel 22 and the sleeve 26 are each configured to ensure that the composite tube 12 is centered. As used herein, the term "centered" refers to the position of the composite tube 12 within the induction coil 40 and with the electromagnetic field generated by the induction coil 40.

As indicated above, the rigid mandrel 22 is preferably formed of metal and the sleeve 26 is preferably formed of a ceramic. However by way of example and not limitation, in alternative embodiments, either one or both of the rigid mandrel 22 and the sleeve 26 can be formed of one of the following: metal, a metallic material, a conductive material, a nonconductive material containing enough conductive material to be operable to provide heat during induction heating, and a combination thereof. It should be appreciated that both the rigid mandrel 22 and the sleeve 26 are formed of a material that is capable of maintaining its shape throughout the heating process sufficient to support the tube 12.

At least one of the sleeve 26, the rigid mandrel 22, and the tube 12 must be configured to be operable to be heated by induction coil 40 during induction heating. In this regard, at least one these structures is operable as a heating element and is positioned within the effective region of induction coil 40. In some embodiments, only the rigid mandrel 22 is utilized to support the composite tube 12 and to provide heat to the work region W of the composite tube 12. In other embodiments, only the sleeve 26 is utilized to support the composite tube 12 and to provide heat to the work region W of the composite tube 12.

In some embodiments the induction coil 40 is positioned within a recess or hollow defined within rigid mandrel 22. In some embodiments the induction coil 40 can be positioned within the composite tube 12 such that a sleeve 26 that is positioned outside of the composite tube 12 is configured to be heated by the induction coil 40 thus heating the composite tube 12.

In another embodiment, the composite tube 12 is configured to operate as the heating element. In such an embodiment, the fiber in the composite is configured to be electrically conductive such as carbon or metal. Thus the composite tube 12 can be heated directly as a heating element without utilizing rigid tube 22 or the sleeve 26 as the heating element. In such an embodiment both rigid tube 22 and the sleeve 26 can be a ceramic or another nonconductive material.

The induction coil 40 is configured to be electrically connected to a power source S and an electrical ground G. The induction coil 40 is configured such that when current is passed through it from source S to ground G, heat is generated within the rigid mandrel 22 as will be described further below with regards to the operation the apparatus 10.

Continuing to refer to FIG. 1, the induction coil 40 includes a plurality of coils or turns 41 that are grouped into a first zone 42, a second zone 44, and a third zone 46. According to the illustrated embodiment, each zone includes the same number of the turns 41. As a result, the total number of the turns 41 within the induction coil 40 is three times the number of the turns 41 in each zone. As shown in FIG. 1, the turn-to-turn spacing is constant within each zone. As used herein, the term "turn-to-turn spacing" refers to the distance between any two adjacent turns 41 within the induction coil 40. As shown in FIG. 1, the turn-to-turn spacing of the first zone 42 is different than that of the adjacent the second zone 44. The turn-to-turn spacing of the coils 41 within the first zone 42 and within the third zone 46 is the same.

It should be appreciated that there can be only a single turn in a zone and there can be any number of zones. In this manner, an induction coil can be formed to generate a predetermined temperature profile by choosing the number of zones, the turn-to-turn spacing within a zone, and the spacing between zones.

Figure 5:
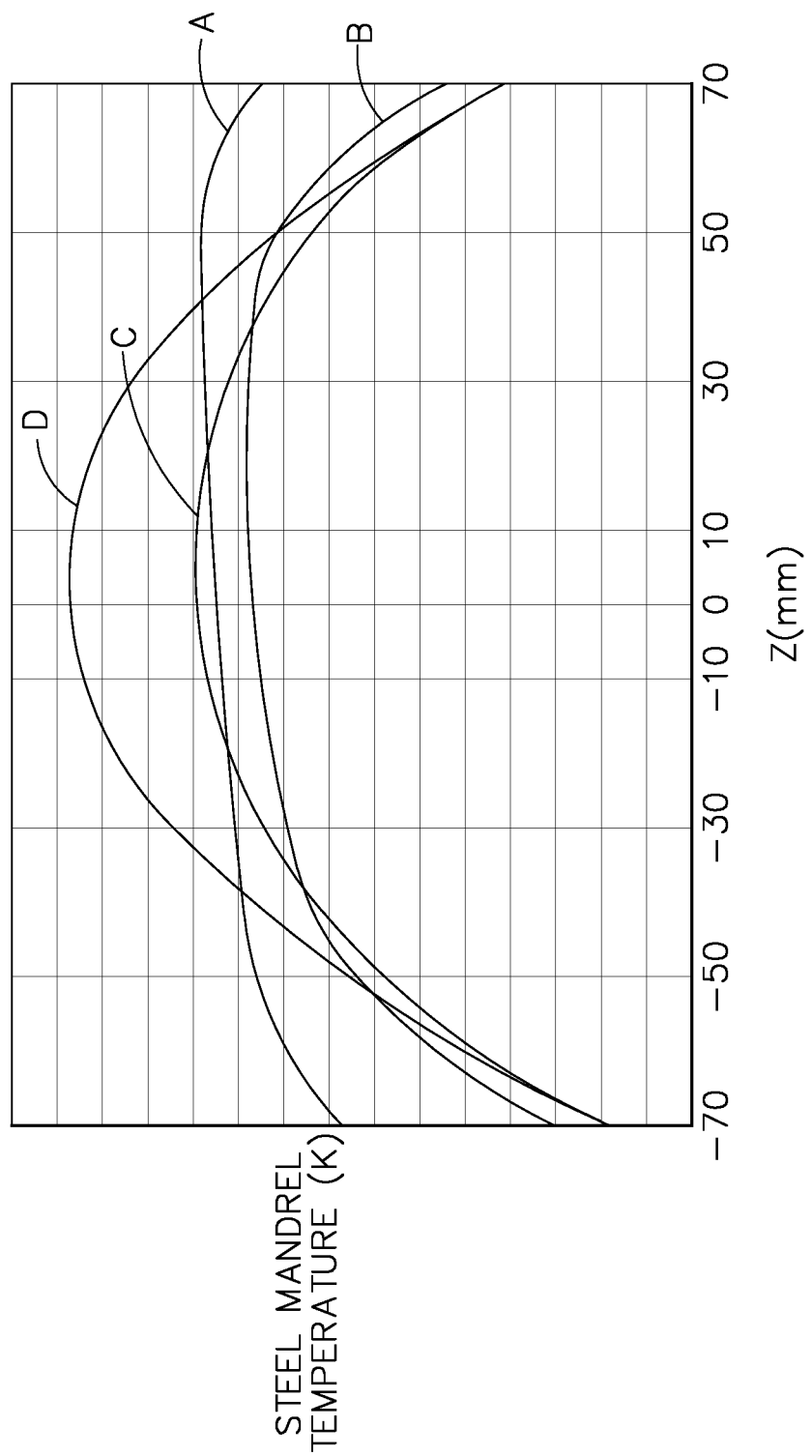
FIG. 5 is a chart showing hypothetical temperature profiles for 4 different induction coils comparing conventional induction coils to induction coils according to the present invention.

Choosing the spacing between zones and the spacing of the coils 41 within a zone allows one to shape the induction power density and thereby shape the temperature profile imparted on the composite tube 12 by the induction coil 40. As shown in FIG. 5, the configuration of the induction coil 40 can affect a temperature profile. It is believed that the flatter a temperature profile, the more consistent the composite tube 12 will respond to bending. Therefore a flatter temperature profile is desirable. Also, when the temperature profile is flatter and longer, it is easier to maintain the length of work region W of the composite tube 12 within an acceptable temperature range.

To provide a relatively flat temperature profile over a section of the composite tube 12, as shown by curve A in FIG. 5, where heat is free to conduct away from the working region W in both axial directions, the turn-to-turn spacing should be symmetric, with the largest turn-to-turn spacing occurring in the middle zone or zones. As shown by curves B and C in FIG. 5, adjustments in turn-to-turn spacing of the coils 41 within the first zone 42, the second zone 44, and a third zone 46 provide different temperature profiles. Curve D shown in FIG. 5 represents a heating profile provided by an induction coil with uniform turn-to-turn spacing throughout the length of the induction coil. The length of the generally flat temperature profile is preferably at least twice the diameter of the tube 12 to be bent.

According to a hypothetical example, an induction coil 40 can be configured as follows: the number of zones is 3, the number of turns in each zone is 5. The turn-to-turn spacing in first zone is 0.05 inches. The turn-to-turn spacing in the second zone is 0.10 inches. The turn-to-turn spacing in the third zone is 0.05 inches. According to this example, the first zone of 5 turns is of length 0.25" (25% of the total length), the second zone of 5 turns is of length 0.5" (50% of the total length), and the last zone of 5 turns is of length 0.25" (25% of the total length). Such a configuration should provide a relatively flat heat profile as indicated by curve A.

According to another hypothetical example, the coil design may be configured such that turn-to-turn spacing is asymmetrical across the zones. Such a configuration could be useful when the heat conductive properties are such that heat is generally limited to be conducted axially in only one direction away from the work region W. As a result, the coil design might include three zones each having five turns. Turn-to-turn spacing in the first zone could be 0.04 inches, and the second zone 0.06 inches, and in the third zone 0.1 inches. This exemplary embodiment gives a coil with a 1" total length, 3 zones, and 15 turns where the first 5 turns take up the first 20% of the total length, the next 5 turns take up the next 30% of the total length, and the final 5 turns take up the final 50% of the coil. It should be appreciated that specialty induction heating coils may be designed utilizing by varying the number of zones, the number of turns within a zone, the turn-to-turn spacing and the spacing between the zones. Thus a predetermined temperature profile can be achieved with the induction coil 40 depending on thermal boundary conditions.

Referring again to FIG. 1, a bending apparatus 60 is positioned near the induction coil 40. The bending apparatus 60 includes a die 62 and a clamp 64. Clamp 64 is connected to a hydraulic cylinder 66 by a hydraulic shaft 68. The hydraulic cylinder 66 and the hydraulic shaft 68 are configured to be cooperatively engaged such that hydraulic cylinder 66 and hydraulic shaft 68 can be operated by a source of hydraulic power such that hydraulic shaft 68 can extend from and retract into hydraulic cylinder 66. In this manner, clamp 64 and die 62 can be moved relative to each other.

It should be noted that the bending apparatus 60 is configured to be heated. The bending apparatus 60 is generally heated to a temperature near that of the work region W of the composite tube 12 just after the work region W leaves the induction coil 40. It should be appreciated that the temperature of the bending apparatus 60 can be chosen such that cooling rates and physical characteristics of the composite tube 12 are controlled as desired. The bending apparatus 60 is also configured such that it can be cooled in a controlled manner. In this fashion, a bend 80 of the composite tube 12 can be cooled from the bending temperature gradually.

A flexible mandrel 24 extends from an end of the rigid mandrel 22 into the bending apparatus 60. The metal is configured to have sufficient flexibility to support the composite tube 12 during formation of a bend 80. More specifically, the flexible mandrel 24 is configured to support the composite tube 12 at work region W while a bend 80 is being formed. The flexible mandrel 24 is configured to be flexible and to conduct heat. In the illustrated embodiment, the flexible mandrel 24 is formed of a metal. By way of example and not limitation, the flexible mandrel 24 can be formed of one of the following: metal, brass, steel, copper, titanium, aluminum, ceramic, copper and aluminum alloy such as Ampco, and a combination thereof.

The rigid mandrel 22 and the flexible mandrel 24 are configured such that the composite tube 12 can be moved along the rigid mandrel 22 and the flexible mandrel 24 after work region W of composite 14 has been heated. The composite tube 12 can be moved such that it is partially on the rigid mandrel 22 and partially on the flexible mandrel 24. Alternatively, the composite tube 12 can be moved such that it is not on the rigid mandrel 22 but is at least partially supported by the flexible mandrel 24.

The present invention can be understood through a description of the operation thereof. Steps for providing a bend 80 in the composite tube 12 are as follows: A) positioning the rigid mandrel 22 within the composite tube 12; B) positioning the sleeve 26 such that it surrounds the composite tube 12; C) positioning the composite tube 12 such that at least a portion of the composite tube 12 having the rigid mandrel 22 therein is positioned within the induction coil 40; D) applying current to the induction coil 40; E) heating the rigid mandrel 22; F) heating work region W of the composite tube 12 to a predetermined temperature range, temperatures within the predetermined temperature range being preferably within plus or minus 20° F. of a target temperature and more preferably plus or minus 10° F. of the target temperature where the target temperature is greater than glass transition temperature; G) removing work region W from the induction coil 40; H) positioning the composite tube 12 such that at least a portion of work region W is on the flexible mandrel 24; I) heating bending device 60; J) positioning work region W such that it is between die 62 and clamp 64; K) closing bending device 60 such that work region W is captured between die 62 and clamp 64 and the composite tube 12 is bent around die 62 forming bend 80; L) removing the flexible mandrel 24 from work region W of the composite tube 12; M) opening bending device 60; and N) removing the composite tube 12 therefrom.

Figure 2:
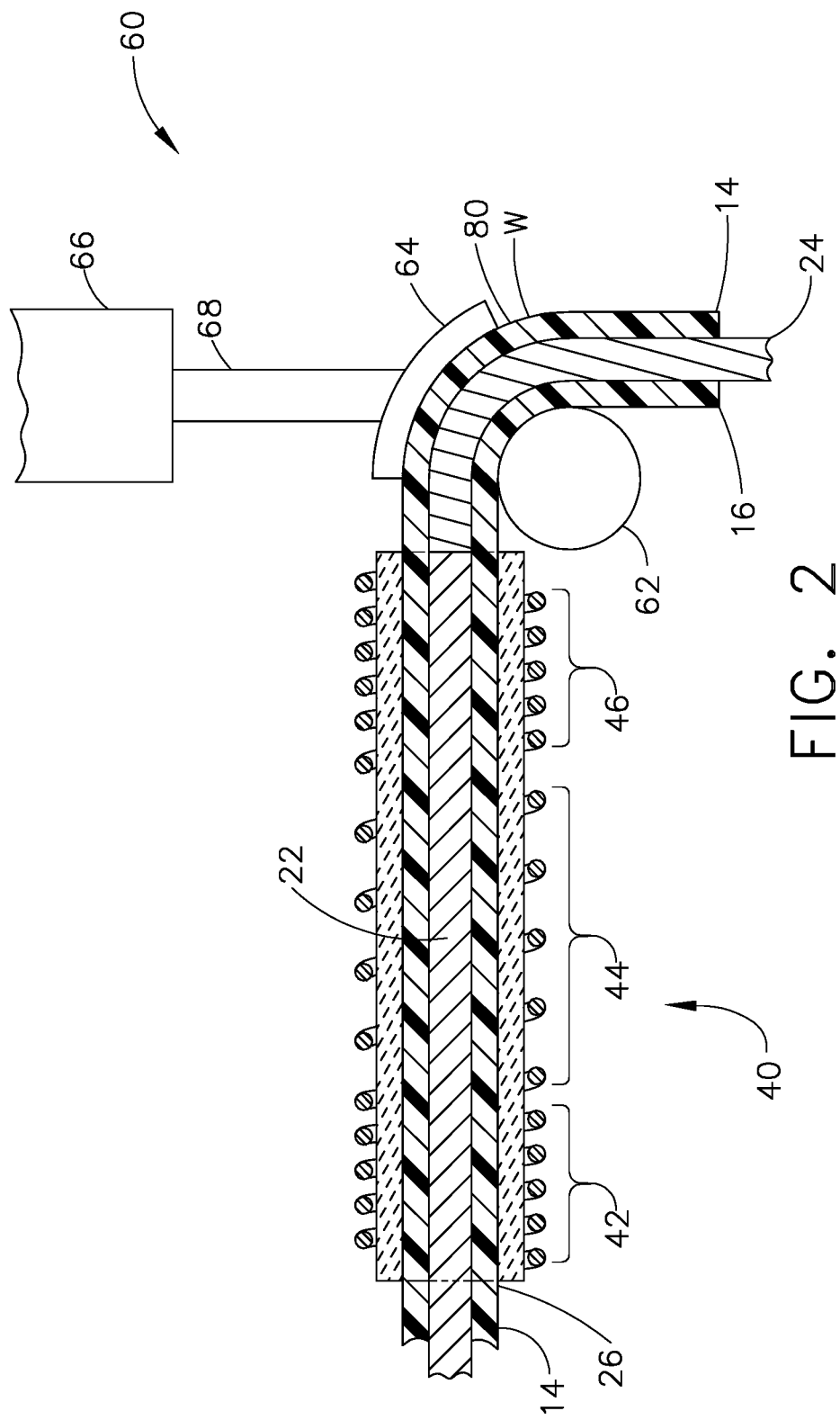
FIG. 2 is a partially cutaway side view of an apparatus for induction heating and bending of a thermoplastic tube showing a composite tube having one bend.
Figure 3:
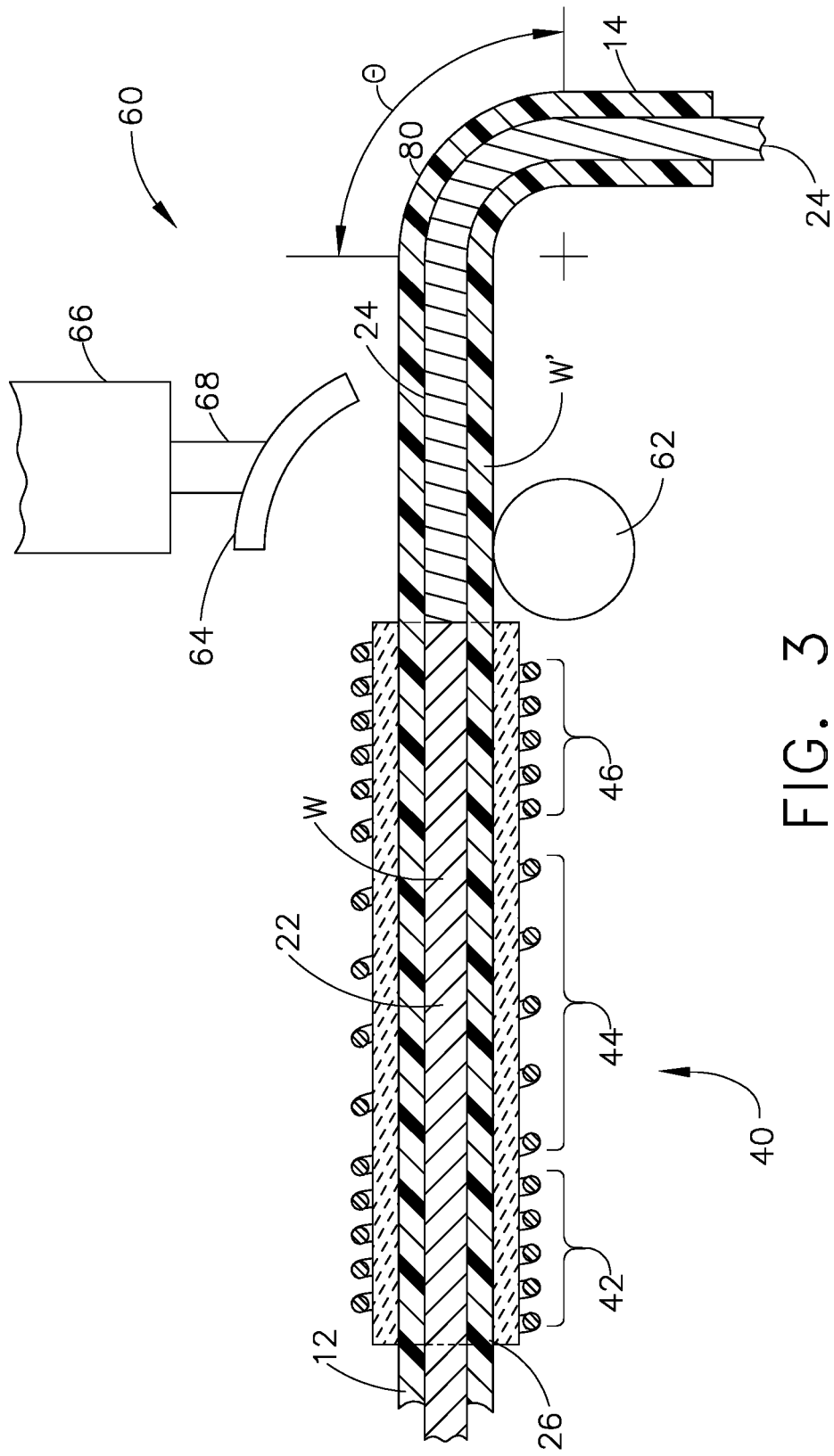
FIG. 3 is a partially cutaway side view of an apparatus for induction heating and bending of a thermoplastic tube showing a composite tube that has one bend that is positioned such that a second bend can be formed therein.
Figure 4:
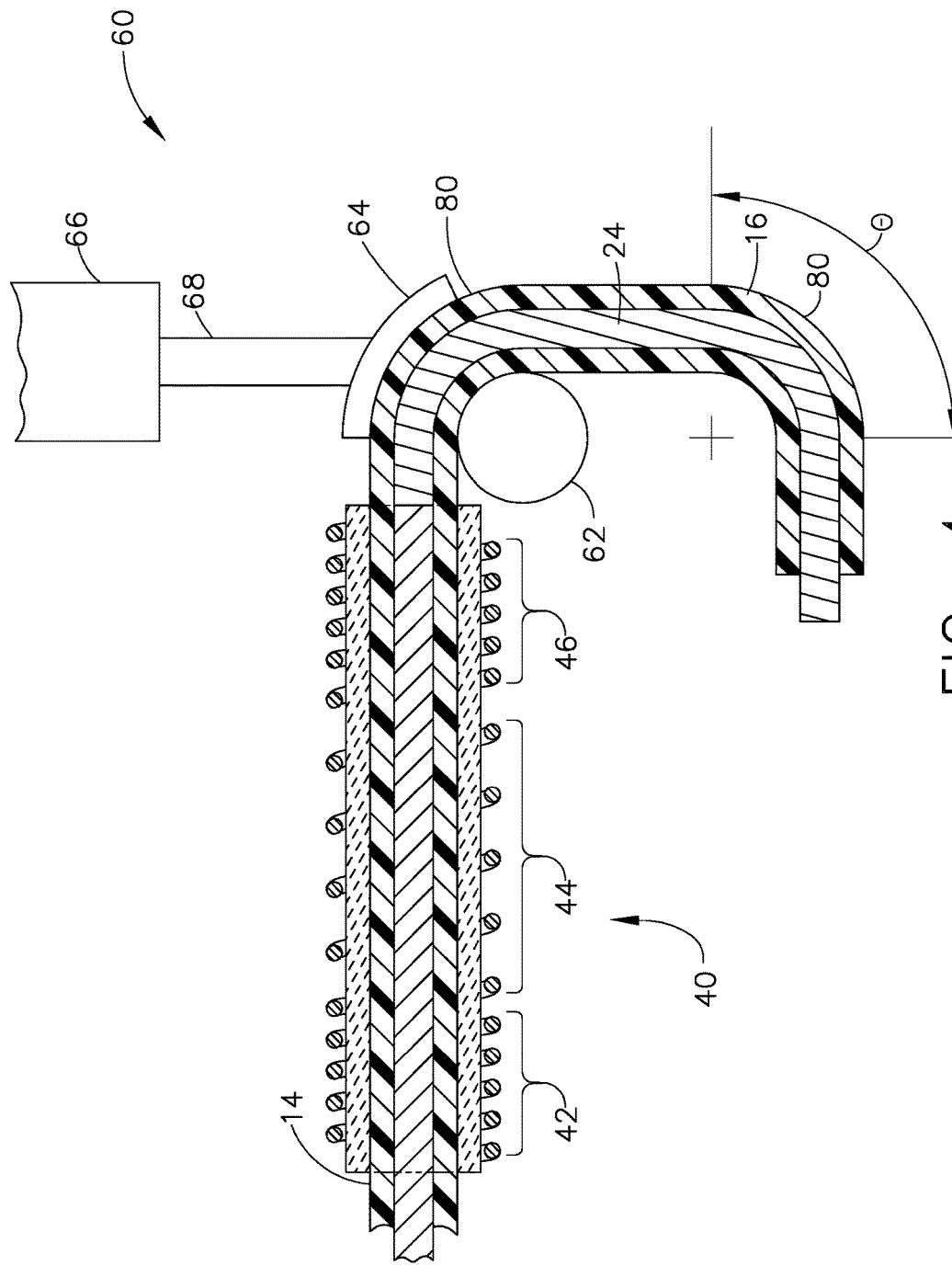
FIG. 4 is a partially cutaway side view of an apparatus for induction heating and bending of a thermoplastic tube showing a composite tube that has had two bends formed therein.

In the above manner, the work region W of the composite tube 12 can be heated by the induction coil 40 and then moved to a position where bending device 60 can act to bend the composite tube 12. As shown in FIG. 2, a bend 80 has been formed in the composite tube 12. The step of closing the bending device 60 to bend the composite tube 12 can be performed incrementally. Incremental bending allows the die 62 to stop after the composite tube 12 has been bent a few degrees. Time is provided for the material of the composite tube 12 to relax before a further increment of bending is commenced. In this manner the strain rate associated with bending the composite tube 12 is kept to acceptable levels. When an additional bend is desired to be formed, the composite tube 12 is repositioned if necessary to define a new W which will be the region the new bend 80 is formed in. The process described above is repeated such that the new W is heated. FIG. 3 shows the composite tube 12 having been repositioned such that new W is positioned within bending device 60 prior to formation of another bend 80. FIG. 4 shows the new bend 80 having been formed within the composite tube 12. It should be noted that the bends can be at different angles Θ.

It should be appreciated that in order to form a second bend 80 in a composite tube 12, the first bend 80 is formed and moved such that a new region of the composite tube 12 is positioned within the induction coil 40 defining a new work region W. The process is then repeated and can be repeated multiple times for multiple bends. It should be appreciated that the composite tube 12 can be rotated such that the second bend 80 and the first bend 80 extend into different planes. The degree of each bend 80 can be different from other bend 80 is within a single the composite tube 12.

The rate of heating the step F heating work region W should be controlled as appropriate to allow for the composite tube 12 to be removed from the rigid mandrel 22. In other words, the metal mandrel expands faster than composite tube when exposed to heat and the rate of heating due to the induction coil 40 should be limited such that the metal mandrel is removable from the composite tube 12 as required in step G removing work region W from the induction coil 40.

One of the advantages provided by bending a composite tube according to the method as described above is that the length of the composite tube 12 that can be heated, and thus bent, is longer than can be heated according to conventional methods. Another of the advantages provided by induction heating according to the method described above is that the temperature of the composite tube can be controlled carefully such that matrix in the composite tubes does not deteriorate as it might when heated to a temperature that is too high. Another of the advantages provided by induction heating according to the method described above is that tubes can be bent more quickly than with conventional methods.

The foregoing has described an apparatus and method for induction heating and bending of the composite tubes. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying potential points of novelty, abstract and drawings), or to any novel one, or any novel combination, of the steps of any method or process so disclosed.

What is claimed is:

1. An apparatus for bending a composite tube, the apparatus comprising:
   an induction coil that includes multiple turns spaced apart by a turn-to-turn spacing and the turn-to-turn spacing changes at least once along a length of the induction coil;
   a mandrel that includes a first portion and a second portion, and the first portion is rigid and the second portion is flexible, wherein the second portion extends from an end of the first portion, and wherein the second portion extends outside of the induction coil;
   a heating element positioned near the induction coil; and
   wherein the induction coil is configured to cause the heating element to increase in temperature.

2. The apparatus for bending according to claim 1, wherein the heating element is positioned at least partially within the induction coil.

3. The apparatus for bending according to claim 2 wherein the induction coil includes a first zone that includes multiple turns that are positioned at a first turn-to-turn spacing;
   a second zone that includes multiple turns that are positioned at a second turn-to-turn spacing; and
   wherein the first turn-to-turn spacing is different than second turn-to-turn spacing.

4. The apparatus for bending according to claim 3, wherein the induction coil includes a third zone and the third zone includes multiple turns that are positioned at a third turn-to-turn spacing; and
   wherein the third to turn-to-turn spacing is different from the second turn-to-turn spacing.

5. The apparatus for bending according to claim 4, wherein the first turn-to-turn spacing is smaller than second turn-to-turn spacing which is smaller than third turn-to-turn spacing.

6. The apparatus for bending according to claim 1, further comprising a bending device.

7. The apparatus for bending according to claim 6, wherein the heating element is the first portion of the mandrel.

8. The apparatus for bending according to claim 6, wherein the second portion of the mandrel extends into the bending device.

9. The apparatus for bending according to claim 8, wherein the bending device includes a die and a clamp.

10. The apparatus for bending according to claim 1, wherein the heating element is a sleeve.

* * * * *